J. B. DAWSON.
BEET CROWNER.
APPLICATION FILED APR. 27, 1912.
1,067,589.
Patented July 15, 1913.
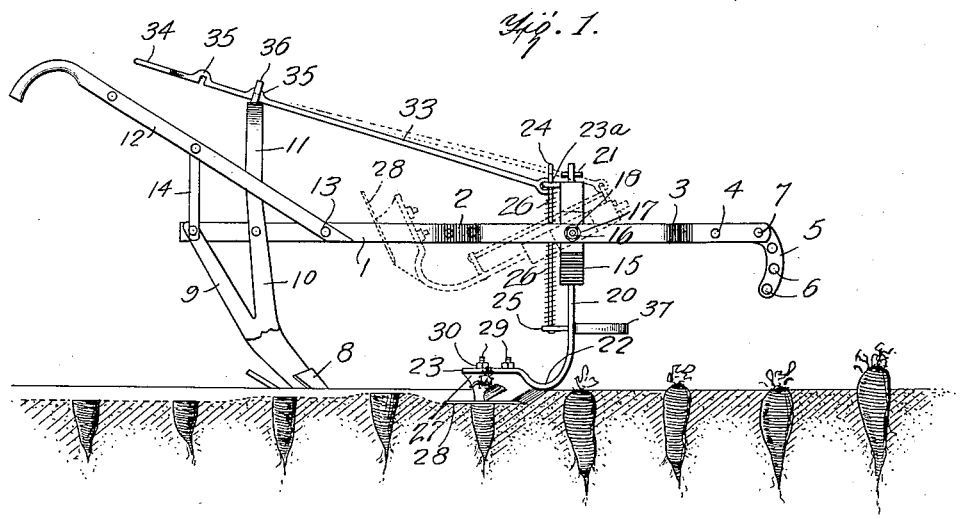
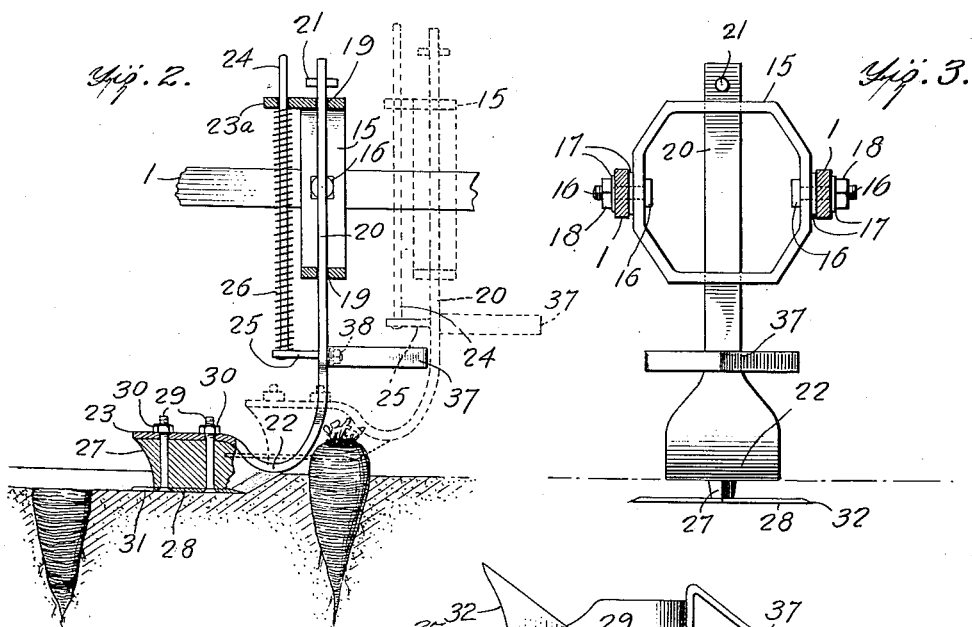
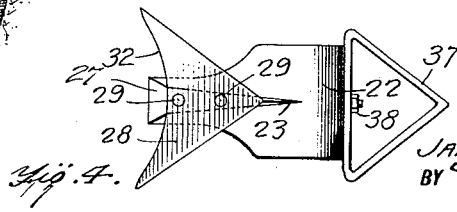
WITNESSES
L. H. Schmidt.
C. E. Trainor
INVENTOR
JAMES B. DAWSON,
BY Munn & Co.
ATTORNEYS

UNITED STATES PATENT OFFICE.

JAMES B. DAWSON, OF POMPEYS PILLAR, MONTANA.

BEET-CROWNER.

1,067,589.

Specification of Letters Patent.

Patented July 15, 1913.

Application filed April 27, 1912. Serial No. 693,642.

*To all whom it may concern:*

Be it known that I, JAMES B. DAWSON, a citizen of the United States, and a resident of Pompeys Pillar, in the county of Yellowstone and State of Montana, have invented a new and useful Improvement in Beet-Crowners, of which the following is a specification.

My invention is an improvement in beet crowners, and has for its object the provision of a simple, inexpensive and easily operated device of the character specified capable of being attached to existing lifting machines, wherein means are provided for crowning the individual beets while yet held in position in the ground, at a predetermined depth, and wherein means are provided for insuring the crowning of each beet at an equal distance from its top, and wherein means are also provided for permitting the device to be moved into or out of operative position.

In the drawings:—Figure 1 is a side view of the improvement; Fig. 2 is an enlarged detail sectional view of the crowning means; Fig. 3 is an enlarged front view of the same; and Fig. 4 is a bottom plan view of the crowning device.

The present embodiment of the invention is designed for use with the type of lifters shown, and comprising a supporting frame composed of laterally spaced longitudinal bars 1, offset inwardly intermediate their ends, as shown at 2, and again near their front ends, as shown at 3, the said front ends being adjacent to each other and connected by rivets 4.

An arc-shaped clevis 5 provided with a longitudinal series of openings 6 secured between the front ends of the bars at 7, and draft apparatus may be connected with the openings of the clevis. A plow 8 for lifting the beets is shown arranged below each bar, and each plow is connected to the adjacent bar by means of a shank consisting of arms 9 and 10, diverging toward their upper ends, and both secured to the bar.

Each arm 9 is secured to the rear end of the adjacent bar, and each arm 10 is extended above the bar, as shown at 11, and the extended portions 11 are connected. A handle 12 is secured to each bar 1, as shown at 13, and each handle inclines upwardly away from the frame. A link or strut 14 connects each handle to the adjacent bar, at the rear end thereof.

The improvement is supported by a hexagonal frame 15 which is arranged between the bars 1, between the offsets 2 and 3. The frame is pivoted to the bars by means of bolts 16, each bolt being passed from within outwardly. The bolts are engaged by nuts 18 outside the bars 1 and washers 17 are arranged on the bolts between the bars 1 and the frame and between the said bars and the nuts. The upper and lower members of the frame 15 are slotted, as shown at 19, and the shank 20 of the crowning device is slidable through the slots.

A pin 21 is passed transversely of the shank above the frame, and the lower end of the shank is enlarged laterally at both sides, as shown at 22, and is then bent rearwardly at approximately a right angle to the shank to form a rearwardly extending angular arm or portion 23, and the said arm is provided with a downwardly extending arch 22 adjacent to the shank and the rear end of the arm is reduced at each side as shown more particularly in Fig. 4. The upper member of the frame 15 is provided with a rearwardly extending lug $23^a$, having a vertical opening through which is slidable a rod 24 secured at its lower end to a rearwardly extending arm 25 on the shank. A spring 26 encircles the rod between the lug $23^a$ and the arm, and acts normally to press the shank downwardly. A block 27 of triangular form is seated below the point 23, and a cutting blade 28 of approximately triangular form is arranged below the block, and is secured to the pointed portion of the shank by means of bolts 29, passing upward through registering openings in the blade, block and shank. The bolts have their heads countersunk in the block, and are engaged by nuts 30 above the pointed portion 23 of the shank. The blade is as before stated roughly triangular, the apex being at the front and in the center line, and the sides diverge at very nearly a right-angle to each other.

The base 31 of the blade is at the rear, and the said base is concave. The block is narrow, being of equal width with the point of the shank so that very nearly the entire area of the blade is free. The side edges of the blade are beveled and sharpened and means are provided for swinging the blade into and out of operative position. The said means comprise a rod or bar 33 provided at its rear end with a handle 34, and near the rear end with a pair of spaced transverse notches or recesses 35. The front end of the rod or bar is pivoted to the lug 23ª before mentioned. The rod or bar slides through a bearing 36 on the connection between the upper ends of the extensions 11 of arm 10, and the rod or bar may be moved longitudinally and held in adjustable position by engaging the notches 35 with the lower edge of the bearing.

When the rod or bar is engaged with the forward notch 35, the frame 15 stands in the full line position of Fig. 1. When, however, the rod or bar is moved forwardly to engage the rear notch with the bearing, the frame 15 and connected parts take the dotted line position of the said figure. When the frame is in this position the crowning device is out of operative position.

The improvement may be easily applied to existing beet lifters of the type in question, the only change required being the forming of the openings for the bolts 16. The pin 21 limits the downward movement of the shank, and the said shank is normally pressed downward by the spring. The arched portion 22 of the shank moves in engagement with the surface of the ground and engages the top of the beet in front of the cutter, and thus determines the depth at which the blade will cut. The blade will thus cut the same amount from each beet in the row, regardless of the position of the beet. The said portion is in fact a guide for the blade. It will be noticed that the lowest point of the arch is about half the distance between the point 23 and the blade.

In operation, the beet lifter is drawn over the ground with the blade 28 at the center of the row of beets. As the frame progresses, the guide engages each beet in turn, and just before the guide passes off of the beet, the point of the blade strikes the beet. The blade is held by its engagement with the beet from further vertical movement, so that the beet is crowned at the point determined by the guide. Should the succeeding beet be at a different level than the beet just cut, the guide will move up or down, but will engage the top of the beet and position the blade. The spring 26 permits the vertical movement of the blade. Each beet will thus be crowned at the same distance from its top, and the same amount will be removed from each beet.

For use with beets having high tops, a triangular frame 37 is provided, which is secured to the shank 20 of the crowning device at a suitable point, for the purpose of parting the tops or leaves of the beets to avoid covering the preceding beets with the tops. The said frame is an open frame, and is secured in place by a bolt 38 or the like. It will be understood that the guide, that is, the arch 22 may be separate from the angular arm consisting of the said arch 22 and the portion 23 instead of integral therewith as shown. The arrangement shown is for convenience and economy, but it is obvious that the function of the arch is entirely separate from the function of the angular portion of the shaft.

I claim:—

1. The combination with a beet digger and lifter comprising a frame and digging and lifting devices at the rear of the frame, of a means for crowning the beets, comprising an open supporting frame arranged transversely of the frame of the digger, a pivoted connection between the frames on an axis transverse to the digging frame, a shank slidable vertically in the supporting frame, a pin traversing the shank above the supporting frame, said frame having a rearwardly extending lug at its upper side, said shank having a rearwardly extending portion at its lower end, a spacing block seated on the lower face of the rearwardly extending portion, a blade seated on the under face of the block, means for securing the blade and the block to the rearwardly extending portion, an arm extending rearwardly from the shank near its lower end, a rod secured at its lower end to the arm and slidable through the lug on the supporting frame, a spring on the rod between the lug and the arm and acting normally to press the shank downwardly, a rod pivoted to the lug for swinging the supporting frame to bring the blade into or out of operative position, means for holding the blade in either position, said blade being approximately triangular and arranged with its apex in front and extending on both sides of the shank, said shank having a depending guide in front of the blade for engaging the top of each beet as the point of the blade engages the side of the beet to determine the position of the blade with respect to the beet.

2. The combination with a beet digger and lifter comprising a frame and digging and lifting devices at the rear of the frame, of means for crowning the beets, comprising an open supporting frame arranged transversely of the frame of the digger, a pivotal connection between the frames on an axis transverse to the digging frame, yielding means pressing the shank downwardly, means for limiting the downward movement of the shank, means engaging the upper end of the frame for swinging the frame, means for holding the frame in adjusted position, said shank having a rearwardly extending portion at its lower end, a blade secured to the rearwardly extending portion in spaced position below the same, said blade being approximately triangular and arranged with its apex in front and extending on both sides of the shank, said shank having a depending guide in front of the blade for engaging the top of each beet as the point of the blade engages the side of the beet to determine the position of the blade with respect to the beet.

3. The combination with a beet lifter and digger, of means for crowning the beets, said means comprising a supporting frame mounted to swing on an axis transverse to the lifter, a shank slidable vertically in the frame and provided at its lower end with a rearwardly extending arm, a blade secured to the said arm in spaced relation, said blade being substantially triangular in form and arranged with its apex at the front and extending on both sides of the arm, the shank having a guide depending in front of the blade for engaging the top of a beet immediately before the blade strikes the side of the beet to determine the position of the blade with respect to the beet, yielding means normally pressing the shank downwardly, means for limiting the downward movement of the shank, means for swinging the frame to bring the blade into or out of operative position, and means for holding the blade in adjusted position.

4. The combination with a beet lifter and digger, of a means for crowning the beets, said means comprising a supporting frame mounted to swing on an axis transverse to the lifter, a shank slidable vertically in the frame and provided at its lower end with a rearwardly extending arm, a blade secured to the said arm in spaced relation, said blade being substantially triangular in form and arranged with its apex at the front and extending on both sides of the arm, the shank having a guide depending in front of the blade for engaging the top of a beet immediately before the blade strikes the side of the beet to determine the position of the blade with respect to the beet, yielding means normally pressing the shank downwardly, means for limiting the downward movement of the shank, and means for swinging the frame to bring the blade into or out of operative position.

5. The combination with a beet lifter and digger, of a means for crowning the beets, said means comprising a supporting frame mounted to swing on an axis transverse to the lifter, a shank slidable vertically in the frame and provided at its lower end with a rearwardly extending arm, a blade secured to the said arm in spaced relation, said blade being substantially triangular in form and arranged with its apex at the front and extending on both sides of the arm, the shank having a guide depending in front of the blade for engaging the top of a beet immediately before the blade strikes the side of the beet to determine the position of the blade with respect to the beet, yielding means normally pressing the shank downwardly, and means for limiting the downward movement of the shank.

6. The combination with a beet lifter and digger, of a means for crowning the beets, said means comprising a supporting frame mounted to swing on an axis transverse to the lifter, a shank slidable vertically in the frame and provided at its lower end with a rearwardly extending arm, a blade secured to the said arm in spaced relation, said blade being substantially triangular in form and arranged with its apex at the front and extending on both sides of the arm, the shank having a guide depending in front of the blade for engaging the top of a beet immediately before the blade strikes the side of the beet to determine the position of the blade with respect to the beet, and yielding means normally pressing the shank downwardly.

7. The combination in a beet lifter and digger, of means for crowning the beets, said means comprising a supporting frame mounted to swing on an axis transverse to the lifter, a shank slidable vertically in the frame and having a topping device at its lower end, means for raising and lowering the shank, and a substantially triangular frame secured to the shank, the plane of the frame being transverse to the shank, the apex thereof being in front.

JAMES B. DAWSON.

Witnesses:
E. A. BOSCHERT,
A. A. BOSCHERT.